Aug. 27, 1946.　　　　F. W. STEIN　　　　2,406,443

THERMOSTATIC SWITCH

Filed Jan. 1, 1944

INVENTOR.
Frederick W. Stein
BY
ATTORNEY.

Patented Aug. 27, 1946

2,406,443

UNITED STATES PATENT OFFICE 2,406,443

THERMOSTATIC SWITCH

Frederick W. Stein, Atchison, Kans.

Application January 1, 1944, Serial No. 516,628

1 Claim. (Cl. 200—140)

The invention relates to new and useful improvements in thermostatic switches.

Specifically, the thermostatic switch is particularly adapted for use in grain germinators or in other capacities where it is necessary to have a readily adjustable temperature control means capable of automatically and accurately maintaining a selected temperature in a relatively wide temperature range. For example, seed germinators are most efficient if maintained at a lower temperature during the nighttime than during the daytime. Moreover, the different specific temperatures maintained, as well as the particular range between the daytime and nighttime temperatures, vary considerably according to the particular type of seed being germinated.

An important object of the invention is to provide a thermostatic switch that is automatically operative, to maintain different predetermined temperatures and that can be readily adjusted to provide a selected temperature.

Another object of the invention is to provide a device of the above mentioned character that is operative over a wide temperature range.

Still another object of the invention is the provision of a device of the above mentioned character that is simple in construction and efficient in operation.

Other objects and advantages of the invention will be apparent during the course of the following description.

Figure 1:
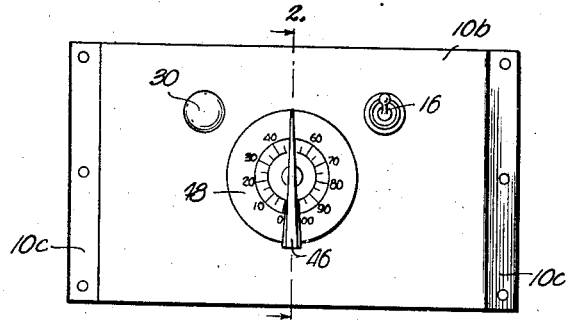
Figure 5:
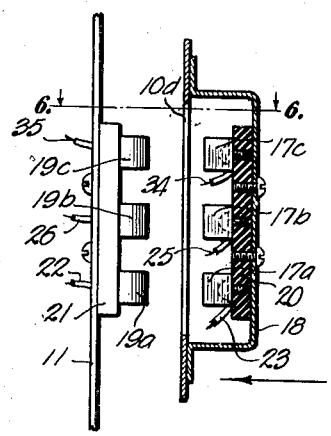
Figure 2:
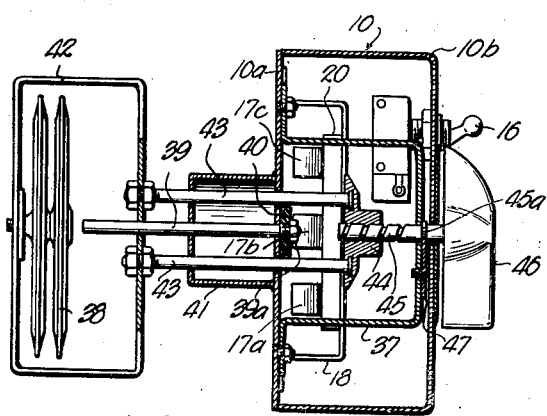
Figure 6:
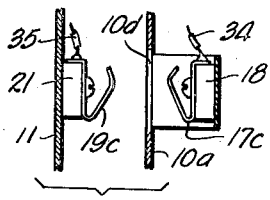
Figure 3:
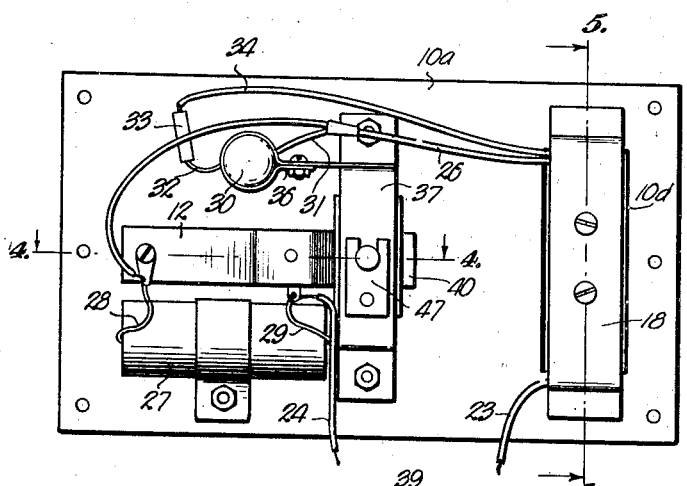
Figure 4:
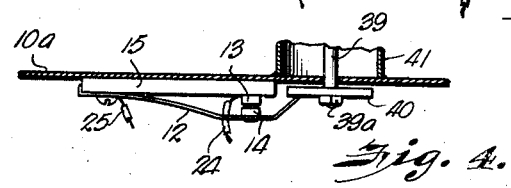

In the drawing forming a part of this specification and wherein like numerals are employed to designate like parts throughout the same, Fig. 1 is a top plan view of a thermostatic switch embodying the invention, Fig. 2 is a transverse sectional view taken on the line 2—2 of Fig. 1, Fig. 3 is a view similar to Fig. 1 but showing the cover of the switch housing removed, Fig. 4 is a fragmentary longitudinal sectional view taken on the line 4—4 of Fig. 3, Fig. 5 is a transverse sectional view taken on the line 5—5 of Fig. 3 showing the manner in which electric current is supplied to the switch, and Fig. 6 is a fragmentary longitudinal sectional view taken on the line 6—6 of Fig. 5.

In brief, the device is adapted to automatically control the flow of current through an electric heater so that the heater maintains the surrounding space at a selected temperature. The flow of current to the heater is regulated by a switch adapted to be opened and closed by a spirit wafer. The wafer is adjustable so that it opens the switch when the space is heated to the selected temperature and closes the switch when the temperature drops below the selected temperature. The invention resides primarily in the structure for operating the switch from the wafer and in the manner in which the wafer is mounted and adjusted to operate the switch at a selected temperature.

In the embodiment of the device shown in the drawing, the switch is operated by the wafer through the medium of a slidable pin. The wafer, itself, is mounted in a shiftable carriage which is manually movable to adjust the wafer relative to the pin. The arrangement is essentially simple, making the device economical to manufacture. At the same time, it permits precise adjustment of the wafer so that the temperature control is exceedingly accurate.

Referring now to the drawing, wherein for the purpose of illustration is shown a preferred embodiment of the invention, the numeral 10 designates a box or housing which consists of a base plate 10a and a cover or case 10b. The housing carries the various parts and adjuncts of the switch and is mounted on a wall 11 of the structure to be heated by means of end flanges 10c. When the device is used on a grain germinator, the housing is preferably mounted on the front wall above the seed trays. Within the housing 10 is a thermostatically operated switch which comprises a switch arm 12 and contacts 13 and 14. The switch arm and contact 13 are insulated from plate 10a by the dielectric member 15 while contact 14 is carried by the switch arm. The switch arm is flexed when the contacts are separated and normally urges the contacts together. This switch, together with the manually operated switch 16 on case 10b, controls the flow of current through an electric heater (not shown).

As shown in Figs. 5 and 6, a bank of contacts 17a, 17b and 17c carried by a bracket 18 adjacent one end of the housing is adapted to register with a bank of contacts 19a, 19b, and 19c on wall 11. The banks of contacts are electrically insulated from the bracket 18 and wall 11 by bars 20 and 21. When housing 10 is mounted on wall 11, contacts 19a, 19b and 19c extend through the opening 10d in the base plate 10a and engage contacts 17a, 17b and 17c.

The manner in which electric current is supplied to the switch and the manner in which the current flows through the switch to control the heater is now described. Current from a suitable source passes through the heater, thence through conductor 22 and contacts 19a and 17a to a conductor 23 attached to the manually operated switch 16. From the switch 16 the current passes through conductor 24 to contacts 13 and 14. When these contacts are engaged, the current flows through switch arm 12 and conductor 25 to contacts 17b and 19b and thence through conductor 26 back to the source. A small electrolytic condenser 27 connected at opposite sides of the switch by conductors 28 and 29 prevents arcing between contacts 13 and 14 when the switch is being opened or closed. The circuit also includes a pilot light 30 which is lighted when current flows through the heater. Current from conductor 26 passes to the bulb 30 through conductor 31 and thence through conductor 32, resistor 33, conductor 34, contacts 17c—19c and conductor 35 to a suitable ground. Bulb 30 is supported by the horizontal arm 36 which projects from an essentially U-shaped bracket 37 bolted to plate 10a. Bulb 30 extends through cover 10b as best shown in Fig. 1, and is clearly visible to indicate whether the heater is operating.

The thermostatic switch is automatically opened and closed by a spirit wafer 38 through the medium of a pin 39 and a block of insulating material 40. The pin 39 extends through and is slidably supported by a hollow boss or bearing 41 on the bottom of plate 10a. Block 40, secured to the inner end of pin 39 by nut 39a, extends under the movable end of the switch arm 12. The wafer 38 is supported within the structure being heated by a carriage which is slidably mounted to selectively position the wafer with respect to the distal end of pin 39. The carriage comprises a rectangular frame 42, guide rods 43 and a crosshead 44. Frame 42 carries the wafer and supports the outer end of pin 39, the guide rods are slidably supported by boss 41 and crosshead 44 connects the inner ends of the guide rods. The carriage is actuated by a shaft 45 which screw-threadedly engages crosshead 44, as shown in Fig. 2. Shaft 45 is supported by bracket 37 and its outer end extends through case 10b to receive the indicator knob or handle 46. A latching plate 47 carried by bracket 37 has a forked end which fits into the annular groove 45a in the shaft holding the shaft against longitudinal movement but permitting free rotation thereof. As shown in Fig. 1, indicator 46 moves across a temperature scale 48 when shaft 45 is rotated. Since it is held against longitudinal movement, rotation of the shaft causes the carriage to slide relative to the switch operating pin 39. Wafer 38 contracts when the media surrounding it cools. Pin 39 follows the wafer and permits switch arm 12 to bring contacts 13 and 14 together. When this occurs current flows to the heater and the media around the wafer becomes heated. As the temperature rises, wafer 38 expands and pushes pin 39 against switch arm 12. When the wafer has expanded sufficiently to separate contacts 13 and 14, current can no longer flow to the heater. The heater remains deenergized until the thermostatic switch is again closed. This cycle is repeated over and over again to maintain a relatively constant temperature in the structure being heated. The particular temperature maintained depends upon the position of the wafer with respect to the pin 39. As described, the wafer may be selectively positioned by handle 46 so that it operates the thermostatic switch at a predetermined temperature. Temperature scale 48 is correlated with the movement and position of wafer 38 so that indicator handle 46 registers the temperature at which the wafer operates the switch. By providing the threaded connection between crosshead 44 and shaft 45 with a relatively long lead, ample adjustment of the wafer 38 is assured by rotation of the indicator through 360° or less.

By moving the wafer relative to a switch operating member, a highly efficient and accurate construction is achieved. Moreover, this unique arrangement is so mechanically simple that the device is economical to fabricate. This construction also permits ready and accurate adjustment of the wafer relative to the switch operating means and the adjustment can be easily accomplished by a rotatable manual control indicator. The switch is operative over a wide temperature range and can be accurately adjusted by a relatively slight movement of the manual indicator.

It is to be understood that the form of the invention herewith shown and described is to be taken as a preferred example of the same and that various changes are contemplated and can be made without departing from the spirit of my invention or the scope of the appended claim.

Having thus described my invention, I claim:

A thermostatic switch comprising a housing, a normally closed electrical switch within the housing, a wafer sensitive to temperature variations, a pin slidably mounted between the switch and the wafer adapted to coact with the wafer to open said switch, a frame carrying said wafer, guide rods slidably mounted in said housing supporting said frame at one end, a crosshead within the housing mounted on the other end of said guide rods, a dial calibrated with a temperature scale mounted on the face of said housing, a rotatable shaft screw-threadedly engaging said crosshead and extending through the center of said dial with an indicator mounted on its extending end, means for preventing longitudinal movement of said shaft whereby rotation of said indicator to any desired point on the calibrated dial adjusts the position of said wafer relative to the distal end of said pin causing the switch to be opened when the temperature of the media surrounding said wafer corresponds to that indicated on said dial.

FREDERICK W. STEIN.